Patented Oct. 1, 1946

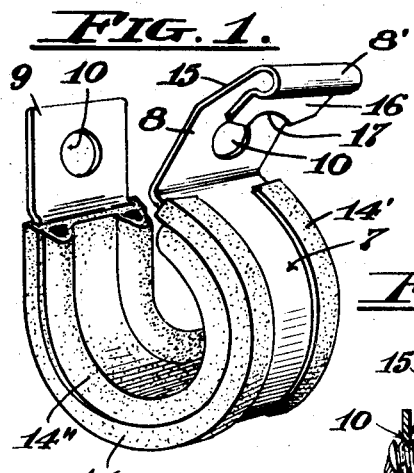
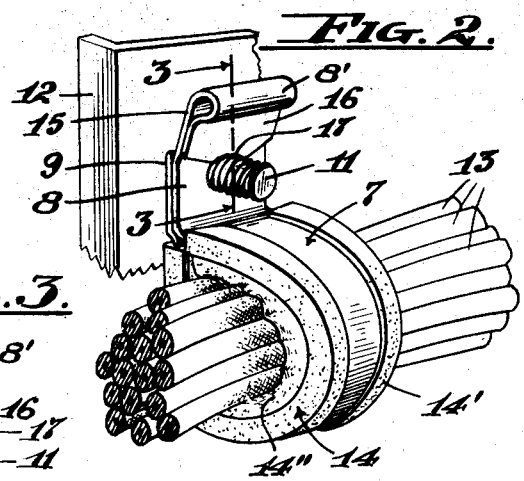
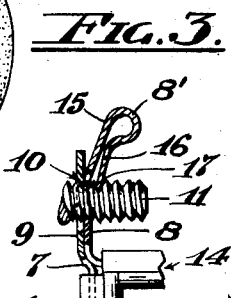
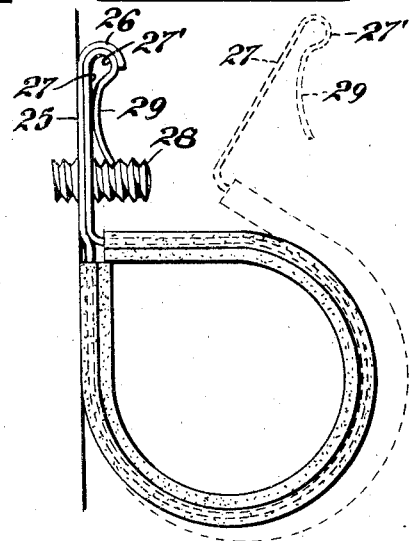
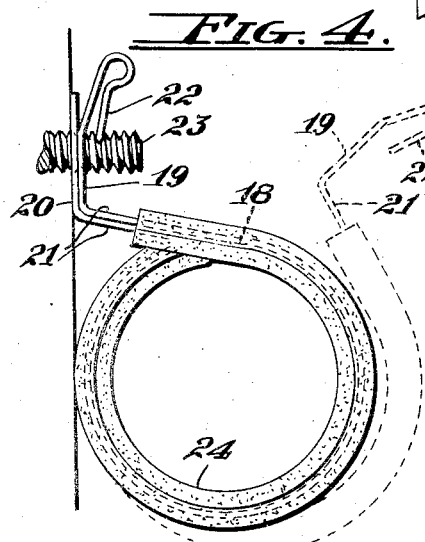
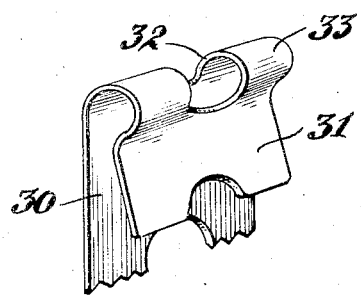

2,408,572

UNITED STATES PATENT OFFICE 2,408,572

WIRE OR CONDUIT CLIP

Eugene M. Morehouse, Tujunga, Calif., assignor to Adel Precision Products Corp., a corporation of California Application May 15, 1944, Serial No. 535,773

7 Claims. (Cl. 248—74)

This invention relates to harness clips such as used in aircraft and the like to secure bundles of wires or conduits to the structural parts of the aircraft past or adjacent which the wires or conduits are extended for the purpose of holding said wires or conduits in the desired positions and protecting them against chafing wear and disarrangement.

An object of my invention is to provide a spring metal clip of the character described in which is embodied a simple, inexpensive and efficient locking means for automatically engaging the screw threads of the bolt or screw employed for securing the clip to a support, so as to positively lock the clip on the bolt or screw and likewise securely fasten the clip to the support, without the use of a nut or the like apart from the clip.

Another object of my invention is to provide a clip such as described in which a spring metal strap formed into an open loop having outwardly extending opposed end portions forming attaching ears, also provides a spring locking tongue or lip as a bent over outer end of one of the opposed end portions of the loop, which tongue or lip is disposed to have tensioned and locking contact with a screw threaded fastening when the latter is inserted through apertures in the end portions of the loop to secure the clip to a support.

Another object of my invention is to provide a spring clip such as described having novel snap fastening members embodied in its opposed end portions, which when said end portions or ears are brought together to close the clip around the wires or conduit, will snap into hooked and locking engagement holding the clip clamped around the wires and ready for attachment to a support, thereby facilitating sub-assembly operations now in general practice in aircraft construction.

A further object of my invention is to provide a clip such as described in which the wire embracing loop is constructed to form a complete circle around the wires in close contact throughout with them when installed, to more effectively hold the wires in place and prevent wear, chafing and damage of them.

A further object is to provide a clip such as described having thereon a cushion strip of soft rubber or the like which completely encircles the wires or conduit, to assure protection thereof against wear and damage.

With the foregoing objects in view together with such other objects and advantages as may subsequently appear the invention is carried into effect as illustrated by way of example in the accompanying drawing in which:

Fig. 1 is a perspective view of a clip embodying my invention as it would appear before installation:

Fig. 2 is a perspective view of the clip as it would appear when installed:

Fig. 3 is a fragmentary vertical sectional view taken on the line 3—3 of Fig. 2:

Fig. 4 is a side elevation of a modified form of the clip as installed and indicating in dotted lines the method of installation:

Fig. 5 is a side elevation of another modified form of the clip as installed:

Fig. 6 is a fragmentary perspective view of another modified form of the clip hereof.

As shown in the accompanying drawing my improved clip is made of a single spring metal strap formed into an open loop or band 7 as here shown of substantially circular form and having outwardly extended normally spaced apart free end portions 8 and 9 provided with openings 10 for reception of a screw threaded or like fastening 11 employed to secure the clip to a support 12, with the wires 13 or conduit (not shown) securely clamped and held therein as shown in Fig. 2.

In the present instance I employ a cushion strip 14 as a lining for the loop to protect the wires by absorbing vibrations and preventing chafing. This cushion 14 is formed of soft rubber, synthetic rubber or the like and has rebent flanges 14' to hold it on the loop, also tubular cushioning ribs 14" extending longitudinally thereof. These ribs are deformable and will accommodate bundles of wires or conduits of different diameters.

In accordance with my invention the end portion 8 is longer than end portion 9 and bent angularly outward as at 15 beyond the aperture therein then over and back toward the loop 7 proper to provide a spring locking tongue or lip 16 extending somewhat divergently from the end portion proper for lockingly engaging the fastening 11 as shown in Fig. 3. A semicircular recess 17 is formed in the outer end of the tongue 16 to receive the fastening 11. The tongue is formed to provide a rounded outer end 8' of the end portion 8, which rounded end is outwardly offset by reason of the angular portion 15 and therefore may be pushed inwardly toward the support 12 to lift or move the tongue out of locking contact with the fastening.

When the fastening 11 is inserted through the support 12 and openings 10 in the end portions 8 and 9, past locking tongue 15 said tongue will spring outwardly and yield to permit the extension of the fastening past it, the recessed outer end edge of the tongue will conform to and have tensioned engagement with the fastening such that upon turning the fastening to tighten it, the tongue will be bent or flexed inwardly toward the support and thereby force the end portions 8 and 9 into contact with one another while the tongue is forcibly drawn into tensioned locking engagement with the threads of the fastening thereby locking the clip on the fastening as shown in Figs. 2 and 3.

If desired the end portions 8 and 9 may be forced onto the fastening after the latter is inserted through the support following which the fastening is tightened as aforesaid. The end portion 8' may be pushed inwardly while the end portion 9 is disposed against the support, to move the tongue out of position to engage the fastening which may then be inserted from the outside, first, past the tongue then through the openings 10 and the support and finally turned to force the tongue into locking engagement therewith and draw the ends of the loop together. However, it is possible to insert the fastening in this manner without flexing the tongue out of the way as next above noted, inasmuch as the resiliency of the tongue and end portion 8' make it possible to force the fastening past the tongue and through the openings 10 and the support, after which the fastening is turned to tighten it and secure the clip in place as aforesaid.

With reference to Fig. 3, it is seen that the tongue 16 is drawn into tighter contact with the fastening 11 as the latter is tightened yet the tongue can be readily lifted or moved out of locking contact with the fastening by flexing the end 8' inwardly.

The modified form of clip shown in Fig. 4 differs only in that the loop 18 is of true circular form and the ends 19 and 20 are considerably offset, there being relatively long lateral extension portions 21 beyond the circular loop proper, on which extensions the ends 19 and 20 are formed. End 19 has a locking tongue 22 identical with the tongue 15 shown in Figs. 1, 2 and 3 and which operates in the same manner relative to the fastening 23. A cushion 24 is provided on the loop 17 in the same manner as in Figs. 1, 2 and 3. This circular cushioned loop formation rather than the somewhat oval formation of the loop shown in Fig. 2 may in some instances and installations be more desirable and better adapted to supporting certain conduit or other lines.

Another modified form of my invention as shown in Fig. 5 differs from the form shown in Fig. 2 only in that the inner end portion 25 which corresponds to end portion 9 is provided with a turned out end forming a hook 26 adapted to hook over the end portion 27 which latter corresponds to the end portion 8 and has a rounded outer end 27' over which said hook extends to reinforce its bent part and to hold the clip pre-assembled on a conduit or bunch of wires with the ends ready for reception of the fastening 28 when installing the clip. In this form the end portion 27 is straight out to the rounded part 27'. A locking lip or tongue 29 is formed on the end portion 27 in the same manner as the tongue 15 and cooperates with the fastening 28 in the same manner to lock the clip in place. This tongue normally appears as shown in dotted lines in Fig. 5 and will be drawn inwardly into locking position as shown in full lines in Fig. 5 upon manipulation of the fastening to complete the installation of the clip.

It is now apparent that the hook 26 and rounded end part 27' serves as snap fasteners which may be interengaged or hooked together by pressing the end portion 27 inwardly to snap the part 27' into the hook 26. This arrangement facilitates sub-assembly operations in which the clips are put on the wires before being installed on the support and holds the ends of the loop together for a ready insertion of the fastening.

Another form of my invention shown in Fig. 6 consists in providing an end portion 30 of any of the clips here shown, with a locking tongue 31 corresponding to the tongue 15 but provided with a recess or cut-out 32 in the rounded portion 33 to reduce the spring tension of the tongue. In some instances a clip having a more flexible locking tongue like the one shown in Fig. 6 may be preferable.

It should be noted that the ends 8 and 9, the tongues 15 and the openings 10 are so formed and relatively arranged that the lower marginal portion of the opening 10 in the end 8 and the upper marginal portion of opening 10 in end 9 are forced into tensioned and threaded contact with opposite sides of the fastening 11 as shown in Fig. 3, when the fastening is tightened and draws the tongue 15 into tensioned and threaded contact therewith, thereby effectively locking and holding the clip on the fastening as though a lock nut were used.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a clip for supporting wires or a conduit, a spring metal strap formed into an open loop having normally spaced apart apertured end portions providing attaching ears adapted to be brought together to close the loop and to align the apertures therein for reception of a fastening for securing the clip to a support, and a spring locking tongue on one of said end portions, said tongue having its outer end edge disposed to have tensioned end contact with the fastening to hold the clip thereon and being movable out of locking contact with the fastening responsive to the flexing of said one end portion toward the other end portion.

2. In a clip for supporting wires or a conduit, a spring metal strap formed into an open loop having normally spaced apart apertured end portions providing attaching ears adapted to be brought together to close the loop and to align the apertures therein for reception of a fastening for securing the clip to a support, one of said end portions being bent angularly outward at a point beyond the aperture therein and then bent over to provide a spring locking tongue extending back toward the loop in outwardly spaced relation to the associated end portion, with its outer end edge disposed to have tensioned locking engagement with the threads of a threaded fastening extended through the apertures in said end portions for securing the clip to a support, said tongue being arranged to be flexed inwardly toward its associated end portion for forcing said end portions together upon the tightening of said fastening to close the clip and secure it to the support.

3. In a clip for supporting wires or a conduit, a spring metal strap formed into an open loop having normally spaced apart apertured end portions providing attaching ears adapted to be brought together to close the loop and to align the apertures therein for reception of a fastening for securing the clip to a support, and a spring locking tongue formed by bending one of said end portions over to extend back toward the loop to dispose the outer end edge of the tongue in position to have tensioned engagement with and hold the clip on a threaded member inserted through said apertured end portions, said tongue being arranged to flex inward toward said end portions and come into closer contact with the threaded member upon the tightening thereof.

4. In a clip for supporting wires or a conduit, a spring metal strap formed into an open loop having normally spaced apart apertured end portions providing attaching ears adapted to be brought together to close the loop and to align the apertures therein for reception of a fastening for securing the clip to a support, and a spring locking tongue formed by bending one of said end portions over to extend back toward the loop to dispose the outer end edge of the tongue in position to have tensioned engagement with and hold the clip on a threaded member inserted through said apertured end portions, said tongue being arranged to flex inward toward said end portions and come into closer contact with the threaded member upon the tightening thereof, and a hook on one of the end portions of the clip adapted to hook with a snap action over the other end portion to reinforce its bent part and to hold said end portion together with the apertures therein aligned, preliminary to the insertion of the threaded member through said apertures and the engagement of said locking tongue with said threaded member.

5. In a clip for supporting wires or a conduit, a spring metal strap formed into an open loop having normally spaced apart apertured end portions providing attaching ears adapted to be brought together to close the loop and to align the apertures therein for reception of a fastening for securing the clip to a support, and a spring locking tongue formed by bending one of said end portions over to extend back toward the loop to dispose the outer end edge of the tongue in position to have tensioned engagement with and hold the clip on a threaded member inserted through said apertured end portions, said tongue being arranged to flex inward toward said end portions and come into closer contact with the threaded member upon the tightening thereof, the outer part of the end portion carrying the locking tongue being angularly offset from the other end portion and subject to inward flexure toward said other end portion to disengage the locking tongue from the threaded member.

6. In a clip for supporting wires or a conduit, a spring metal strap formed into an open loop having normally spaced apart apertured end portions providing attaching ears adapted to be brought together to close the loop and to align the apertures therein for reception of a fastening for securing the clip to a support, and a spring locking tongue formed by bending one of said end portions over to extend back toward the loop to dispose the outer end edge of the tongue in position to have tensioned engagement with and hold the clip on a threaded member inserted through said apertured end portions, said tongue being arranged to flex inward toward said end portions and come into closer contact with the threaded member upon the tightening thereof, said edge of said tongue being recessed to receive the threaded member therein.

7. In a clip for supporting wires or a conduit, a spring metal strap formed into an open loop having normally spaced apart apertured end portions providing attaching ears adapted to be brought together to close the loop and to align the apertures therein for reception of a fastening for securing the clip to a support, and a spring locking tongue formed by bending one of said end portions over to extend back toward the loop to dispose the outer end edge of the tongue in position to have tensioned engagement with and hold the clip on a threaded member inserted through said apertured end portions, said tongue being arranged to flex inward toward said end portions and come into closer contact with one side of the threaded member upon the tightening thereof, said end portions having portions forming margins of the apertures in them, the edges of the material around said apertures being forced into threaded contact with the opposite side of said fastening when said fastening is tightened as aforesaid.

EUGENE M. MOREHOUSE.